US 6,688,606 B2

(12) United States Patent
Hohe et al.

(10) Patent No.: US 6,688,606 B2
(45) Date of Patent: Feb. 10, 2004

(54) GASKET AND A METHOD FOR THE MANUFACTURE THEREOF

(75) Inventors: Kurt Hohe, Langenau (DE); Gunther Unseld, Neenstetten (DE)

(73) Assignee: Reinz-Dichtungs-GmbH CO. KG., Neu-Ulm (DE)

( * ) Notice: Subject to any disclaimer, the term of this patent is extended or adjusted under 35 U.S.C. 154(b) by 268 days.

(21) Appl. No.: 09/848,206

(22) Filed: May 4, 2001

(65) Prior Publication Data

US 2001/0045708 A1 Nov. 29, 2001

(30) Foreign Application Priority Data

May 5, 2000 (DE) .......................... 100 21 975

(51) Int. Cl.[7] ................................ F02F 11/00
(52) U.S. Cl. ................ 277/600; 277/592; 277/593; 277/627; 277/639
(58) Field of Search .................. 277/591, 592, 277/593, 600, 601, 596, 627, 639, 640

(56) References Cited

U.S. PATENT DOCUMENTS 5,122,214 A * 6/1992 Zurfluh et al. .............. 156/220
5,863,046 A 1/1999 Diez et al.
6,053,503 A 4/2000 Buck et al.
6,145,847 A * 11/2000 Maeda et al. ............... 277/593

FOREIGN PATENT DOCUMENTS

| DE | 195 36 718 A1 | 4/1997 |
| DE | 19548236 | 6/1997 |
| DE | 198 29 058 A1 | 1/2000 |

* cited by examiner

Primary Examiner—Anthony Knight
Assistant Examiner—Enoch Peavey
(74) Attorney, Agent, or Firm—Rader, Fishman & Grauer PLLC

(57) ABSTRACT

The invention refers to gaskets suitable for usage in internal combustion engines. The gaskets according to the invention comprise at least one metal layer, the metal layer having one or several openings in accordance with the number and location of the combustion chambers, and, if present, coolant and lubricant passageways of the internal combustion engine, and a metal ring located around the combustion chamber opening(s), the metal ring being laminated on the metal layer and joined to the latter over a plastic layer. The plastic layer provides the gasket in the region of the metal ring with plastic, plastic/elastic or elastic characteristics. Furthermore the invention refers to a method for manufacturing the gasket according to the invention.

17 Claims, 4 Drawing Sheets

GASKET AND A METHOD FOR THE MANUFACTURE THEREOF

FIELD OF THE INVENTION

The present invention is related to gaskets, for example flat metal gaskets suitable for usage in internal combustion engines, wherein the gaskets comprise at least one metal layer, the metal layer having one or several openings in accordance with the number and location of combustion chambers and, if present, coolant and lubricant passageways of the internal combustion engine. Furthermore, the invention concerns a method for manufacturing gaskets according to the invention.

BACKGROUND OF THE INVENTION

In order to form protrusions for providing sealing lines, gaskets having one or several layers frequently include metal rings which are located around the combustion chamber openings of a layer. Among other things, the protrusions formed by the metal rings pursue the object to protect—when the gasket is installed, in particular at high combustion pressures and the "beating" of the cylinder head resulting therein—depressions located for providing additional sealing lines in one or several sheet metal layers from being completely flattened and thus functionally limited or even destroyed. Metal rings which have such a depression based protective function within a flat metal gasket are known as "deformation limiters", "spring way limiters" or "stoppers", as well.

Among other things, stopper rings have so far been attached to certain layers of the flat metal gasket by spot welding. In the gaskets according to U.S. Pat. No. 6,053,503, the attachment is made by continuous laser welding. Along with the relatively high expenditure during manufacture, both welding and soldering, as it is suggested in this context in patent DE 195 36 718-A1, show the disadvantage that the achievable height of the protrusion is almost exclusively determined by the metal sheet thickness of the applied metal ring. Furthermore, the resulting joint is rigid. If plastic or elastic, respectively, characteristics are desired for the stopper, for example to achieve a certain attenuation of the "beatings", additional constructional measures concerning the metal layers or the metal ring, respectively, have to be taken, as for example forming additional depressions in these structural members.

As a way of attaching a ring which serves as a protrusion, U.S. Pat. No. 5,863,046 discloses welding, gluing or the like. In this case too, the height of the protrusion is only determined by the used metal ring. Furthermore, the obtained joint does per se not have any additional plastic, plastic/elastic or elastic characteristics, or at least none worth to be mentioned, in the stopper region of the gasket.

In the patents EP-0 797 029-A1 and in the DE 198 29 058-A1, stoppers manufactured on the basis of thermosetting plastics are described, the thermosetting plastics additionally containing mineral or metal filling material. In contrast to metal ring stoppers, such stoppers show—depending on their composition depending on their composition—plastic, plastic/elastic or elastic characteristics. In particular the stoppers according to patent DE 198 29 058-A1 show good results as they have among other things advantageous thermal conduction characteristics due to their content of metal filling materials, which is an advantage in case large amounts of heat have to be transported. Nevertheless, certain limitations with respect to their applicability in internal combustion engines with very high requirements as for the thermal resistibility of the gasket exist. Furthermore, plastic and filling material have to be selected carefully and mated with each other for each application, since the operating conditions of modern engines in some cases can reach the consistency limits of materials which are used for the above-discussed plastic stoppers containing filling material.

SUMMARY OF THE INVENTION

The present invention provides a gasket comprising at least one metal layer having at least one opening therethrough and a metal ring located around said opening, the metal ring being laminated to the metal layer by a plastic layer, wherein the plastic layer is formed, such that it provides the gasket in the region of the metal ring with a physical characteristic selected from the list of plastic, plastic/elastic and elastic.

Compared to known gaskets with stoppers manufactured on the basis of thermosetting plastics, joining a metal ring and a metal layer of the gasket over a plastic layer according to the claim surprisingly results in an increased temperature resistibility of the obtained protrusion. At the same time, one effect of the usage of the metal ring is that the selection of the constituency of the plastic layer is less critical for a certain application and that the number of possibilities of applying one fixed plastic composition is increased, which is advantageous during manufacture.

Furthermore, by selecting the layer thickness of the plastic layer, in particular in case plastic masses having a high content of filling material are applied, varying requirements to the protrusion to be obtained can be fulfilled in an easy and quick manner without the necessity of applying or keeping on stock, respectively, metal rings of different thicknesses.

Gaskets according to the invention may comprise one or several metal layers (depending on the embodiment, those are also called single-layer, dual-layer or multi-layer sealing constructions). The metal layers may be metal sheets which have openings in accordance with the number and location of the combustion chambers of the internal combustion engine to be sealed and, if necessary, the coolant and lubricant passageways.

Around the combustion chamber opening(s) of the metal layer of at least one of the metal layers in case of dual- or multi-layer flat gaskets), a metal ring is laminated (that is located on the surface), the ring and the layer being connected over a plastic layer. The plastic layer is formed in a way that it provides the gasket in the region of the metal ring with plastic, plastic/elastic or elastic characteristics. This does not exclude that in the region of the metal ring by taking constructional measures, the metal ring itself or other structural members of the gasket are provided with further means which result in plastic, plastic/elastic or elastic characteristics, for example depressions (circular or trapezoidal depressions), edge projections, right-angle bands and the like. Moreover, the formation providing the plastic layer with plastic, plastic/elastic or elastic characteristics can—according to the invention—be limited to certain zones in the region of the metal ring, for example to the region which is not directly adjacent to the cylinder screws. Preferably, the plastic layer of the gasket, however, provides the whole region of the metal ring, that is its complete circumference, with plastic, plastic/elastic or elastic characteristics.

In order to provide the region of the metal ring with plastic, plastic/elastic or elastic characteristics, the plastic layer has to have a certain thickness in this region, wherein the thickness exceeds the usual thickness of plastic layers which are only used for joining or gluing together, respectively, to structural members of the gasket, but which do not considerably contribute to the thickness of certain gasket zones. Accordingly, the plastic layers in gaskets according to the invention preferably have a thickness of at least 5 µm, more preferably 5–150 µm, in particular 5–100 µm and especially preferred 10–50 µm in zones where they provide the gasket with plastic, plastic/elastic or elastic characteristics.

Moreover, the ratio of the plastic layer thickness to the sheet metal thickness of the metal ring, the latter being joined to the metal layer over a plastic layer is preferably within a range of 1:100 to 2:1, particularly within a range of 1:30 to 1:1, and especially preferred within a range of 1:15 to 1:1.

Taking into consideration the characteristics of compositions used for the plastic layer or the filling material composition (substance and size) contained therein, a person skilled in the art can easily determine suitable thicknesses of the plastic layer along with suitable ratios to the sheet metal thickness of the metal ring for obtaining certain plastic, plastic/elastic or elastic characteristics and certain protrusions.

In this context, suitable plastic compositions are plastics manufactured on the basis of thermosetting plastics, the latter containing at least one thermosetting plastic. Preferred examples of such resins are in particular epoxy resins, for example on a bisphenol-A-basis, silicone resins, polyamide resins, polyamidimide resins or phenol resins.

Preferably, thermosetting plastics are applied which are already at room temperature plastically deformable. Preferably, the plastic deformability should remain constant up to the glass transition point, wherein the glass transition point of the thermosetting plastics should be as high as possible and preferably higher than 150° C., especially preferred higher than 180° C., in order to avoid a too early decrease of the support function.

Moreover, the plastic compositions can contain alternative constituents as additives (defoamers, for example based on siloxane or silicone, surfactants or primers, the latter either as a part of the composition or separately applied to the metal layer), cross linking agents (hardeners as in particular aromatic polyamines or metal organic compositions as butyltitanate, vulcanization promoters), solvents (e.g. cyclohexanone, N-methylpyrrolidone) and or thermoplastic excipients as PTFE-, PE-, PP- and PA-powder. Due to the addition of thermoplastic additives to the plastic composition, it is possible to specifically influence the deformation behavior of the composition. In case of thermoplastic polymers, for example the plastic behavior and the glass transition point of the composition can be optimized.

Especially in cases where the plastic layer is exposed to heavy mechanical or thermal stresses and in cases where a relatively large thickness of the plastic layer is desired, the applied plastic composition preferably contains mineral and/or metal or inorganic filling materials in order to improve the consistency. Plastic compositions containing mineral filling materials and being suitable in this context are known for example from the EP 0 797 029-A1.

Plastic compositions having a content of metal filling materials, in particular having a slightly lower weight content of filling material with respect to the plastic, for example in a ratio of below 1:1 to 1:4 or 1:1,5 to 1:3, are likewise preferred. Such compositions are described in the DE 198 29 058-A1. In this context, suitable filling materials are metal powders and/or metal fibers, for example aluminum powder (for example lamellar, non-leafing, average particle size 10–20 µm) and/or whisker fibers (for example having a fiber length of below 10 µm).

According to the invention, for applications where especially high mechanical or thermal stresses occur, filling material containing plastic compositions are preferred in which the mass content of filling material is larger than the content of fixing agents or plastic, respectively. Especially good results can be achieved by applying particle-like filling materials in which each particle has a small surface with respect to the particle volume so that a dense packaging of the filling material particles can be achieved in the manufactured plastic layer, and a relatively high number of particles is directly adjacent to each other so that they directly support each other, and the fixing agent or the plastic used, respectively, in principle has to ensure the composing function for the filling material, whereas the pressings and pressure forces in principle are received by the particle-like filling material.

In this context, preferably globular filling material particles having a smooth surface are applied. Spherical particles which as a rule have the smallest surface to volume ratio are especially suitable here.

As far as the named compositions for especially high stresses and having a high filling material content are concerned, filling material to plastic ratios of 2:1, also ⅔ to ⅓ or even higher filling material contents are preferred. In suitable compositions, content degrees of above 90 mass percent of the filling material can be achieved.

Each particle of the used filling material should have an average particle size within a range of between 5 and 100 µm, wherein at least 80% of the particles should have this particle size. Applying particles of different particle sizes by which denser particle packages and thus higher filling degrees can be achieved, can likewise be suitable.

As already mentioned, metals as well as metal alloys, glass, ceramics (preferably silicon nitride or silicon carbide) or mineral filling materials, whisker fibers and graphite and mixtures of said materials can be taken as filling materials.

In a preferred embodiment of the present invention, the metal layer to which the metal ring is joined over the plastic layer includes a depression which is located around the combustion chamber opening of the layer. In this case, the protrusion formed by the metal ring and the plastic layer can be located directly within the depression (in this case a trapezoidal depression is preferred) or directly adjacent to the depression. In this manner, the depression is protected from being completely flattened when the gasket is installed. It is also possible that the metal ring is joined to a depressionless sheet metal over the plastic layer and that a depression, for example a trapezoidal depression, located in a different metal layer of the flat gasket protects the gasket from being completely flattened. In case of dual- or multi-layer gaskets, especially such constructions are preferred in which the sheet metals adjacent to the engine block and the cylinder head, respectively, that is the outer metal sheets, are provided with a depression around the combustion chamber opening with the depression being protected from being completely flattened by at least one protrusion formed by a metal ring and a plastic layer according to the invention. It is preferred in this case to locate the protrusion, or in case several protrusions are provided as protection for the depression, at least one protrusion directly adjacent to the combustion chamber in order to form a first sealing line there. In this case, the depression which is protected by the protrusion, is located on the side opposite to the combustion chamber opening.

Sealing constructions in which the first sealing line is formed opposite to the combustion chamber opening and in which the depression is protected from being completely flattened by a protrusion according to the invention with the protrusion being located on the side opposite to the combustion chamber opening, are likewise suitable.

Combinations of the above-mentioned construction principles are likewise comprised by the invention. For example, a depression can be surrounded by two protrusions according to the invention on both sides and thus be protected from being completely flattened, wherein one of the two protrusions is directly adjacent to the combustion chamber opening.

As mentioned above, the used metal ring can be flat or kinked. A preferred embodiment is kinked, such that the distance between the metal ring edge opposite to the combustion chamber and the metal layer thereunder to which it is joined is smaller than the distance with respect to the metal ring edge which faces the combustion chamber. By this measure, the dispersion of plastic mass towards the side of the metal ring opposite to the combustion chamber is prevented during manufacture.

One advantage of the gaskets according to the invention is that their construction allows a simple adaptation to varying requirements with respect to the protrusions to be achieved. One further advantage is that especially as far as light weight engines are concerned, occurring deformations of the cylinder head can already be taken into consideration when determining the thickness of the glue layer or its topography, respectively. Especially for these engines, a sealing gap between the engine block and the cylinder head wherein the gap is narrower in a direct vicinity to the cylinder screws than further away. In the gaskets according to the invention, these variations can easily be compensated by suitably varying thicknesses of the plastic layer, wherein in a direct vicinity to the cylinder screws, the plastic layer is chosen thicker than further away.

The above-mentioned variations with respect to the width of the sealing gap in dependence on the distance to the cylinder screws, however, can likewise advantageously be compensated by gaskets according to the invention which do not have an accordingly predetermined topography due to the varying thickness of the plastic layer. In this case, the plastic, plastic/elastic or elastic characteristics of the plastic layer are likewise advantageous insofar as the plastic layer provides a corresponding flexibility or deformability, respectively, in order to compensate the above-mentioned variations of the sealing gap.

Furthermore, the invention provides a method for manufacturing a gasket comprising the steps of:
  a) depositing a plastic layer around an opening of a metal layer;
  b) locating a metal ring on the plastic layer; and
  c) pressing the metal ring and the metal layer so that the plastic layer remains to provide the gasket in the region of the metal ring a physical characteristic selected from the list of plastic, plastic/elastic and elastic characteristics.

The plastic is preferably deposited by means of screen printing, matrix printing or by means of a dispenser. Especially by using screen printing, the height and width of the plastic layer can easily be varied, and thus the layer can without any effort be provided with a desired topography, i.e. with a varying thickness in the direction of circumference, by forming and dimensioning the used serigraphy sieve accordingly.

The plastic layer can be deposited by inserting the plastic into a depression previously formed around the combustion chamber openings of the metal layer. In preferred embodiments of the present invention in which the protrusion forms a first sealing line with respect to the combustion chamber opening and protects an adjacent depression, the plastic layer is deposited directly adjacent to the combustion chamber opening.

The metal ring may be located on a deposited glue layer. In a preferred embodiment of the invention, in case the plastic layer has been provided with a certain topography in step a), the plastic layer is—before or after locating the metal ring in accordance with step b)—provisionally or finally cross linked, in order to provide the plastic layer with the necessary viscosity or rigidity so that the predetermined topography remains unmodified also during the subsequent pressing step c). When applying plastic compositions on the basis of phenol resins—the application of which is especially preferred for a plastic layer topography determined by step a)—, the rigidity necessary for the subsequent pressing step c) can also be achieved by drying instead of provisional or final cross linking, wherein the drying can be done both before and after locating the metal ring according to step b).

In subsequent step c), the metal ring—which is, if necessary, provided with an adherence promoting layer or glue layer, respectively, in case of a provisionally or finally linked plastic layer—and the metal layer are pressed. When applying an adherence promoting or glue layer, the latter per se do almost not contribute at all to the formation of the protrusion formed by the plastic layer and the metal ring. Both plastic on which the provisionally or finally cross linked plastic layer is placed and other types of plastics can be used as adherence promoter or glue, respectively. In principle, the pressing is accomplished, such that a plastic layer thickness remains which is capable of providing the gasket with plastic, plastic/elastic or elastic characteristics after the plastic within the region of the laminated metal ring (or complete curing in case of a prior drying or provisional cross linking step) has cured.

In a further preferred embodiment of the invention, pressing the metal ring and kinking it, such that the distance between its edge opposite to the combustion chamber and the metal layer thereunder is smaller than the distance with respect to its edge facing towards the combustion chamber are simultaneously accomplished. Locating a metal ring which has previously been kinked in the mentioned manner is, however, likewise possible in step b). Said kinking prevents plastic from dispersing during pressing according to step c) to the side of the metal ring which is opposite to the combustion chamber. If necessary, excess plastic is pressed due to the kinking of the metal ring in the direction of the combustion chamber opening, where the plastic along with eventually existing excess metal in a further step d) can be die cut.

Die cutting according to step b) is likewise advantageous, if unkinked metal rings are applied. In both cases, die cutting is accomplished after a provisional or final cross linking of the plastic layer.

The pressing according to step c) can be done symmetrically, especially if a uniform layer thickness of the plastic layer is desired. The method according to the invention, however, allows topographical pressing as well. Topographical pressing means that by applying a locally varying pressure to the metal ring, an accordingly varying height profile of the plastic layer thereunder is formed. Thus, a height profile of the plastic layer varying over the complete circumference and thus a varying height profile of the protrusion formed by plastic and metal ring can easily be made.

In addition to pressing or die cutting respectively, the metal layer can in a further step after the provisional or final cross linking, respectively, of the plastic layer be provided with a depression around the combustion chamber opening.

The plastic can finally cure before or after depositing the metal ring, during or after pressing or before die cutting or the step of additionally providing with a depression. Preferably, the curing is effected by heating. For example, this can be accomplished by integrating a heating coil into the pressing mold which heats the metal ring the metal layer the metal ring is joined to by pressing and especially the encapsulated plastic layer. In order to achieve this, a direct contact of the pressing mold to the pressed layers is necessary. The final curing due to heating can—due to engine heat effects—also be accomplished after the gasket is installed. Moreover, other known methods for curing plastics can likewise be applied in principle.

BRIEF DESCRIPTION OF THE DRAWINGS

Preferred embodiments of the invention which are not intended as limitations will now be explained taking reference to the attached drawing. In case the combustion chamber opening is not depicted in the drawings, it is located on the right hand side of the respective gasket construction, whereas the cylinder head is located above and the engine block below the depicted construction.

DETAILED DESCRIPTION OF THE PREFERRED EMBODIMENTS

Figure 1:
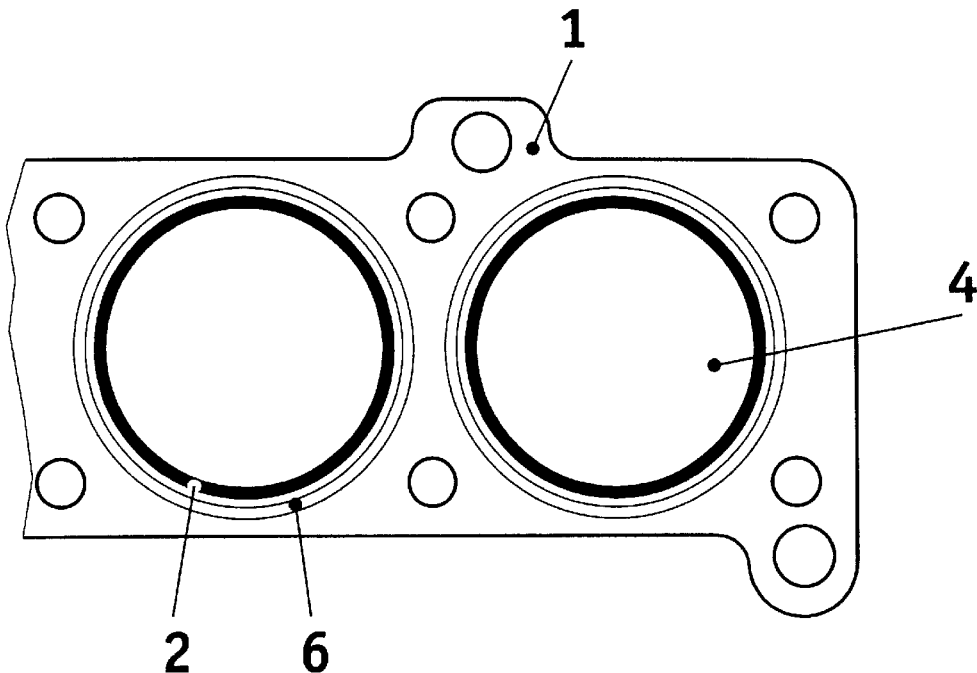
FIG. 1 shows a top view of a portion of a single-layer flat gasket according to the invention, wherein the coolant and lubricant passageways along with the cylinder screw openings are shown.

FIG. 1 shows a top view of a flat gasket according to the invention, in particular a single-layer construction having a metal layer 1 and combustion chamber openings 4. Around each combustion chamber opening 4, a metal ring 2 is located. On the side of the metal ring 2 which is opposite to the combustion chamber opening 4, a depression 6 which is concentrically located around the combustion chamber 4 and the metal ring 2 is located.

Figure 2:
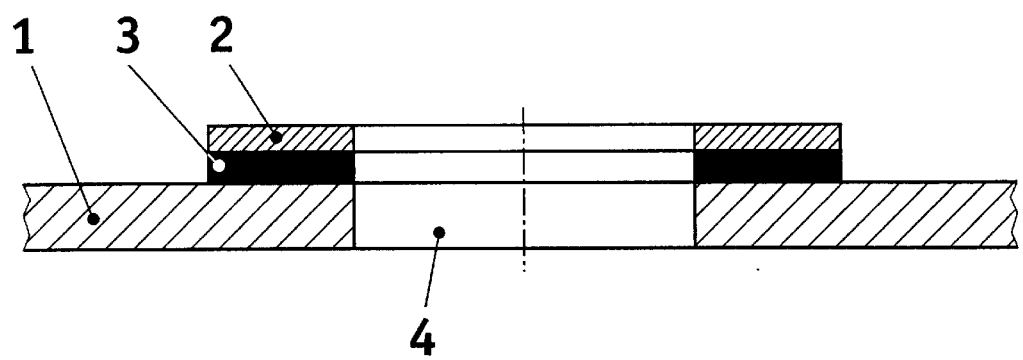
FIGS. 2–6 show cross sections of single-layer gaskets according to the invention, wherein the location of the combustion chamber openings is depicted.

FIG. 2 shows a cross section of the simplest embodiment of the flat gasket according to the invention. Directly around the combustion chamber opening 4 of the metal layer 1, a metal ring 2 is located. The metal ring 2 is joined to the metal layer 1 over the plastic layer 3. The plastic layer 3 is formed, such that it provides the gasket in the region of the metal ring with plastic, plastic/elastic or elastic characteristics.

Figure 3:
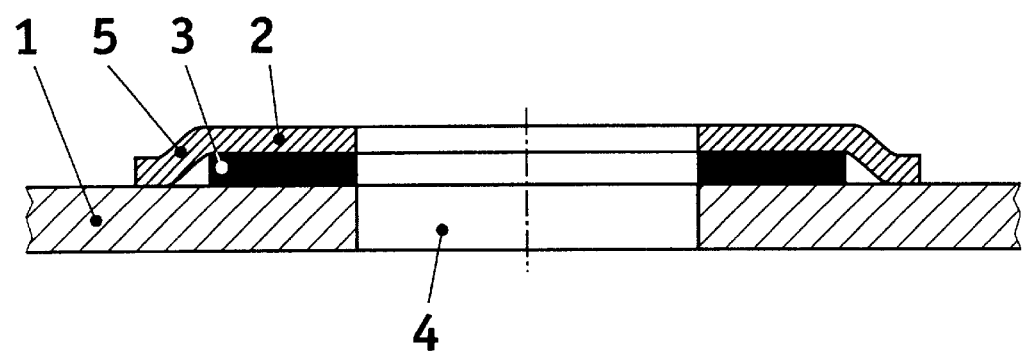

The gasket in FIG. 3 is a modification of the construction shown in FIG. 2. Again, a metal ring 2 is located directly around the combustion chamber 4 of the metal layer 1 and joined to the metal layer 1 over the plastic layer 3 in the shown gasket. The metal ring has a kinking 5. Due to the kinking, the distance between the edge of the metal ring 2 and the metal layer 1 on the side which is opposite to the combustion chamber 4 is smaller than the distance between its edge and the metal layer 1 on the side which faces towards the combustion chamber. In the present embodiment, the kinking 5 involves that the edge of the metal ring 2 which is opposite to the combustion chamber opening 4 gets into direct contact with the underlying metal layer 1.

Figure 4:
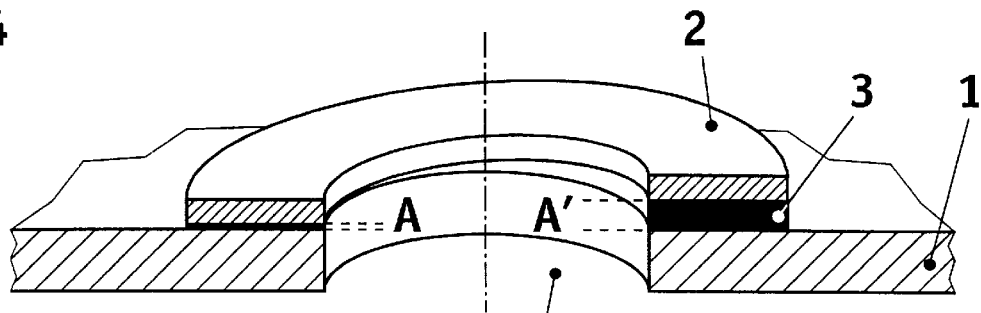

The single-layer flat gasket shown in FIG. 4 corresponds to the gasket according to FIG. 2. In contrast thereto, the plastic layer 3 has varying thicknesses A, A' in the direction of its circumference. Due to the variations of the thicknesses A, A' of the plastic layer 3, variations with respect to the sealing gap width, as they can occur in light weight engines in dependence on the mutual distance of the cylinder screws, are compensated.

A preferred general embodiment of the invention (not depicted in FIGS. 3 and 4) contains a metal ring 2 corresponding to the metal ring 2 shown in FIG. 3 which, however, has varying kinking thicknesses in the direction of the circumference. Due to the application of such a metal ring, the layer thickness of the plastic layer can be controlled by the different predetermined kinking thicknesses during manufacture in pressing step c). In this case, a provisional cross linking or drying step before the pressing step c), respectively, is omitted during manufacture of the gaskets, and a topography of the protrusion formed by the metal ring and the plastic layer is only later formed by pressing according to step c) (topographical pressing).

The gaskets according to the invention, as for example the gasket constructions shown as examples in FIGS. 2–4, can likewise be provided with additional depressions located around the combustion chamber openings 4. The depressions are protected from being completely flattened by the protrusion formed by the metal ring 2 and the plastic layer 3. Furthermore, the gaskets according to the invention, for example the constructions shown in FIGS. 2–4, can be combined either with or without additional depressions, with additional sheet metals provided or not provided with a depression, in order to manufacture the gasket constructions preferred according to the invention.

Figure 5:
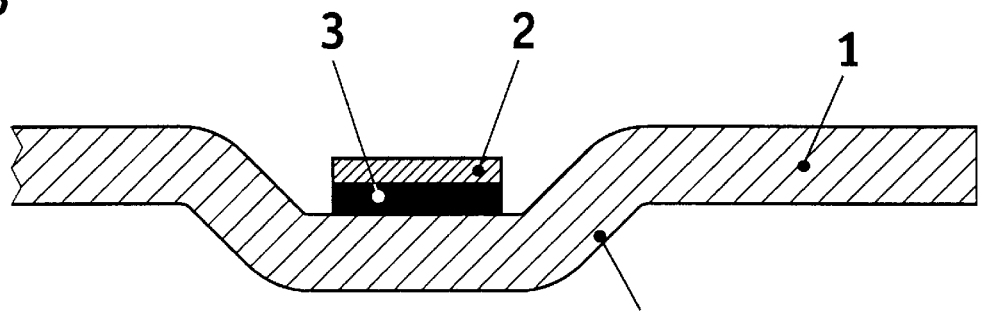

FIG. 5 shows a single-layer gasket construction in which the protrusion formed by a metal ring 2 and a plastic layer 3 according to the invention is located within a depression 6 (trapezoidal in the example) of the metal layer 1. According to its location as shown in FIG. 5, the depression 6 is protected from being completely flattened, when the gasket is installed.

Figure 6:
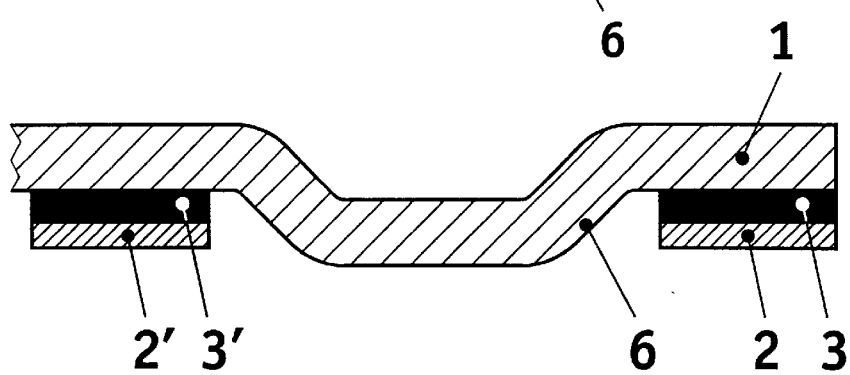

FIG. 6 shows an embodiment of a single-layer flat gasket in which the trapezoidal depression 6 formed in the metal layer 1 is protected by the protrusion formed by the metal ring 2 and the plastic layer 3, with the depression 6 being directly located around the combustion chamber opening. In addition to the protrusion formed by the metal ring 2 and plastic layer 3, an additional protrusion can be present which is located on the side of the depression 6 which is opposite to the combustion chamber and which is formed by the metal ring 2' and the plastic layer 3'. In this configuration, the depression 6 is surrounded by one protrusion on each of their sides and thus especially effectively protected from being completely flattened.

Figure 7:
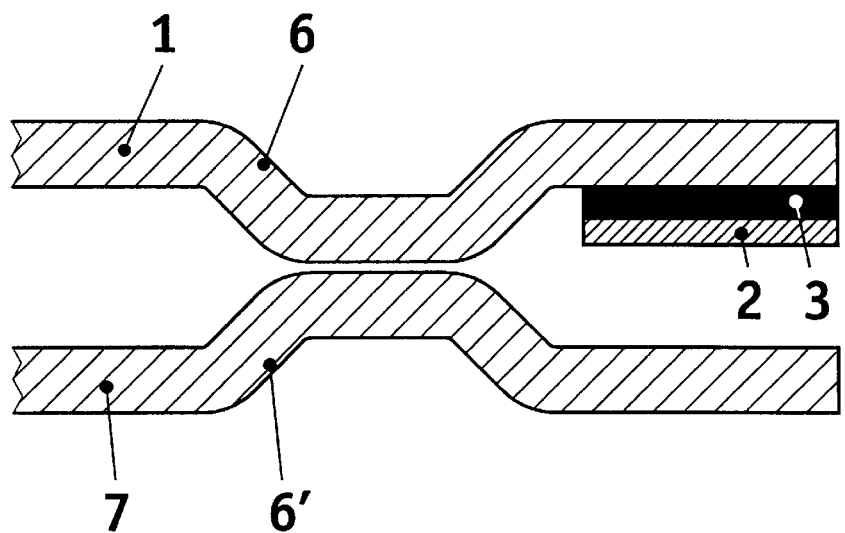
FIGS. 7–11 show cross sections of further dual- or multi-layer gaskets according to the invention.

In principle, the gasket according to FIG. 7 corresponds to the one of FIG. 6. In addition to the metal layer 1 provided with a depression, the gasket includes a metal layer 7 in the form of an additional exterior sheet metal, the latter likewise having a depression 6'. The vertexes of the depressions 6, 6' which are trapezoidal in this case, are facing towards each other. The depressions 6, 6' are protected by the protrusion formed by the metal ring 2 and the plastic layer 3.

Figure 8:
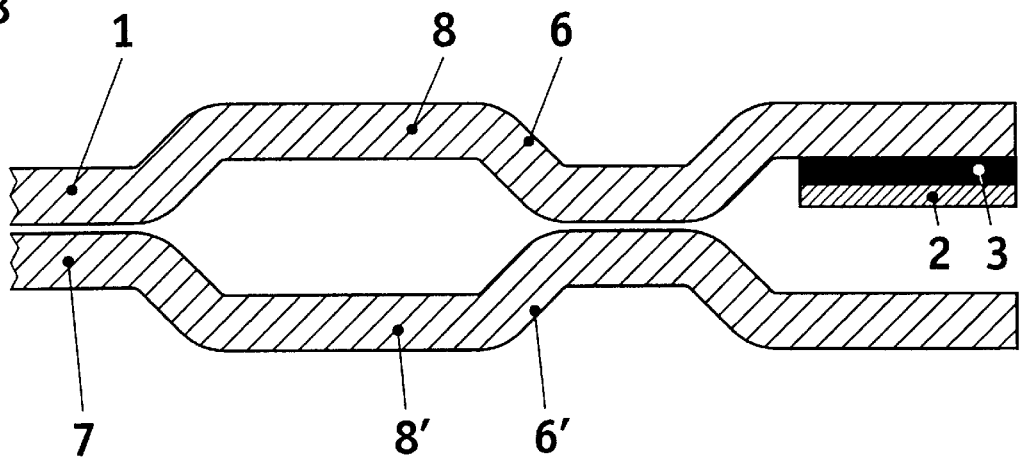

FIG. 8 shows a gasket which resembles to the one shown in FIG. 7. Additionally, the two metal layers 1, 7 each include one additional depression 8, 8' which is—in this case—likewise trapezoidal. In the shown gasket, the vertexes of the depressions 8, 8' face towards opposite directions.

Figure 9:
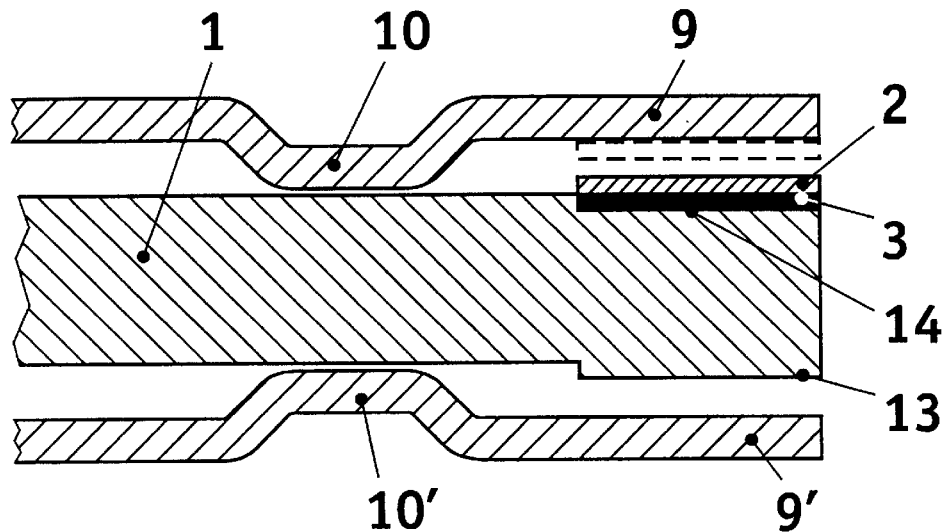

In the construction depicted in FIG. 9, the metal layer 1 joined to the metal ring 2 over the plastic layer 3 is an intermediate metal sheet which is located between the two exterior metal sheets, 9, 9' each having depressions 10, 10'. The protrusion formed by the metal ring 2 and the plastic layer 3 is located in a recess 14 of the metal layer 1. Additionally, the metal layer 1 includes a projection 13 in the region of the protrusion on the side which is opposite to the metal ring 2. In the shown embodiment, the protrusion 14 and the projection 13 are provided by stamping the metal layer 1. As can be seen in FIG. 9, the protrusion formed by the metal ring 2 in the metal layer 3 can be joined to the exterior metal sheet 9 as well. The protrusion formed by the metal ring 2 and the plastic layer 3 and the projection 13 protect the depressions 10, 10' of the two exterior metal sheets 9, 9'.

Figure 10:
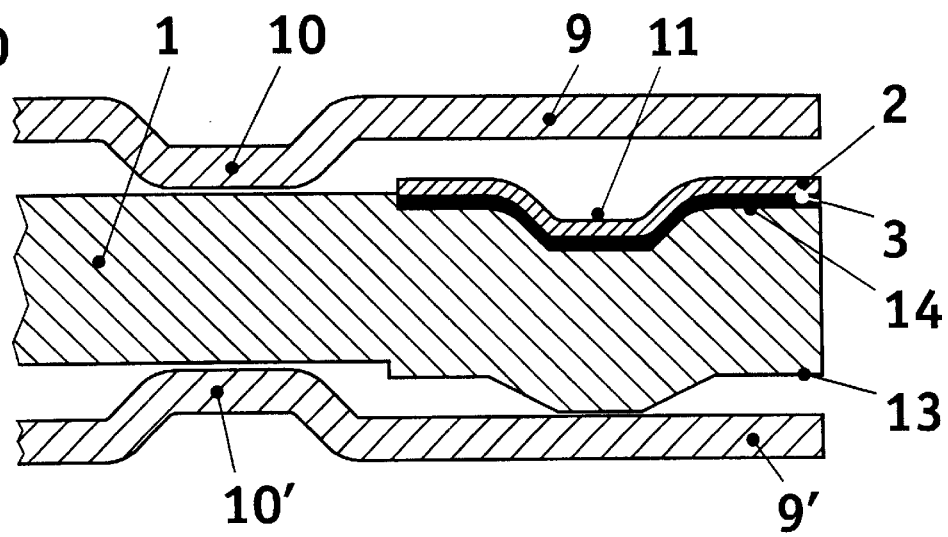

The gasket according to FIG. 10 corresponds to the construction according to FIG. 9 in which the metal ring 2 and the metal layer 1 additionally include a depression 11 in the region of the protrusion formed by the metal ring 2 and the plastic layer 3.

Figure 11:
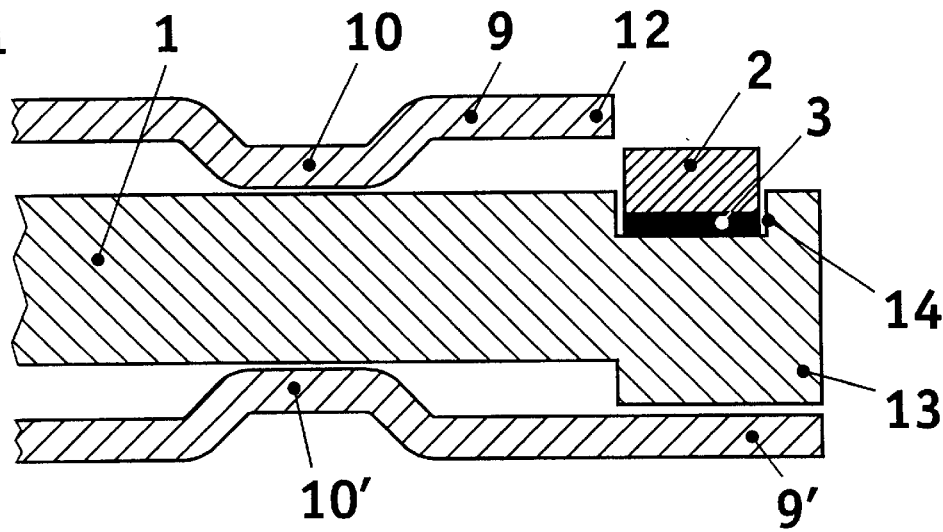

In principle, the gasket depicted in FIG. 11 likewise corresponds to the construction according to FIG. 9. In this case, however, the edge 12 of the exterior metal sheet 9 provided with depressions does not project into the interior of the gasket in which the protrusion formed by the metal ring 2 and the plastic layer 3 is located. Said protrusion is formed, such that it projects beyond the metal sheet thickness of the metal layer 9 and thus protects the depression 10 from being completely flattened, when the gasket is installed.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A gasket comprising at least one metal layer having an exterior surface and at least one opening therethrough, and a metal ring located around said opening such that a portion of the exterior surface of the metal ring is exposed, the metal ring being laminated to the metal layer by a plastic layer, wherein the plastic layer provides in the region of the metal ring a physical characteristic for the gasket selected from the list of plastic, plastic/elastic and elastic.

2. The gasket according to claim 1, wherein the plastic layer contains at least one thermosetting plastic.

3. The gasket according to claim 2 wherein said thermosetting plastic is selected from the list of epoxy resin, silicone resin, polyamide resin, polyamideimide resin and phenol resin.

4. The gasket according to claim 3, wherein said plastic layer further comprises at least one further constituent selected from the list of additives, cross-linking agents, solvents and thermoplastic excipients.

5. The gasket according to claim 1, wherein said plastic layer contains a constituent selected from the list of mineral, metal and inorganic filling materials.

6. The gasket according to claim 1, wherein the metal layer to which the metal ring is laminated includes a depression in a region of said opening.

7. The gasket according to claim 6, wherein the metal ring and the plastic layer form a protecting protrusion the depression so as to protect the depression from flattening upon installation of said gasket.

8. The gasket according to claim 7, wherein said protrusion is located directly adjacent to said opening and the depression is located on a side of the protrusion opposite to said opening.

9. The gasket according to claim 1, wherein said metal ring is kinked, such that a separation is provided between the ring and the metal layer, the separation being lower at an edge opposite to said opening than the separation at an edge facing said opening.

10. The gasket according to claim 1, wherein the plastic layer has a variable thickness which varies according to an angular position with respect to said opening.

11. The gasket according to claim 1, wherein the plastic layer has a variable thickness which varies such that respective local pressures are compensated by respective distances to cylinder screws or a rigidity of a structural member when the gasket is installed.

12. A gasket comprising at least one metal layer having at least one opening therethrough and a metal ring located around said opening, said metal ring being laminated to said metal layer by a plastic layer, wherein said plastic layer provides in the region of the metal ring a physical characteristic for the gasket selected from a list of plastic, plastic/elastic and elastic, and wherein said metal layer to which said metal ring is laminated includes a depression in a region of said opening and said metal ring and said plastic layer form a protecting protrusion for said depression so as to protect said depression from flattening upon installation of the gasket.

13. The gasket of claim 12, wherein said protrusion is located directly adjacent to said opening and said depression is located on a side of said protrusion opposite to said opening.

14. A gasket comprising at least one metal layer having at least one opening therethrough and a metal ring located around said opening, said metal ring being laminated to said metal layer by a plastic layer, wherein said plastic layer provides in the region of the metal ring a physical characteristic for the gasket selected from a list of plastic, plastic/elastic and elastic, and wherein said metal ring is kinked, such that a separation is provided between said metal ring and said metal layer, said separation being lower at an edge opposite to said opening than said separation at an edge facing said opening.

15. A gasket comprising at least one metal layer having at least one opening therethrough and a metal ring located around said opening, said metal ring being laminated to said metal layer by a plastic layer, wherein said plastic layer provides in the region of the metal ring a physical characteristic for the gasket selected from a list of plastic, plastic/elastic and elastic, and wherein said plastic layer has a variable thickness.

16. The gasket according to claim 15, wherein said variable thickness of said plastic layer varies according to an angular position with respect to said opening.

17. The gasket according to claim 15, wherein said variable thickness of said plastic layer varies such that respective local pressures are compensated by respective distances to cylinder screws or a rigidity of a structural member when the gasket is installed.

* * * * *